Patented June 22, 1948

2,443,899

UNITED STATES PATENT OFFICE 2,443,899

PRODUCTION OF N-ALKYLATED AMINO-ANTHRAQUINONES

Armas Victor Erkkila, Attica, and Robert C. Hoare, Hamburg, N. Y., assignors to Allied Chemical & Dye Corporation, New York, N. Y., a corporation of New York No Drawing. Application December 21, 1943, Serial No. 515,126

12 Claims. (Cl. 260—373)

This invention relates to the production of N-substituted aminoanthraquinones by the reaction of an anthraquinone amine containing a replaceable hydrogen atom in a nuclear amino group with an aldehyde. (As employed herein, the term "N-substituted" as applied to aminoanthraquinones denotes an aminoanthraquinone in which one or more of the hydrogen atoms in a nuclear amino group has been replaced by a radical having the formula R—CH$_2$—, wherein R is hydrogen or an aliphatic, cycloaliphatic, aromatic, hydroaromatic or heterocyclic group.) The invention relates more specifically to a process for the production of N-alkylated alpha, alpha-diamino-alpha, alpha-dihydroxy-anthraquinone sulfonates, more particularly, a mixture of mono- and disulfonates of N-methylated alpha, alpha-diamino-alpha, alpha-dihydroxy-anthraquinone, and especially a mixture of mono- and disulfonates of 1,5-di(methylamino)-4,8-dihydroxy-anthraquinone which dyes wool greenish-blue shades which do not appear more reddish under artificial light, from the corresponding alpha, alpha-diamino-alpha, alpha-dihydroxy-anthraquinone disulfonates.

According to the present invention, an N-substituted aminoanthraquinone is produced by reacting an anthraquinone amine containing a replaceable hydrogen atom in a nuclear amino group (that is, anthraquinone, or a derivative thereof, containing one or more nuclear amino groups, at least one of which contains a replaceable hydrogen atom) with an aldehyde and with hydrous oxalic acid containing at least 2 mols of water per mol of oxalic acid, in an inert reaction medium which is a solvent for hydrous oxalic acid. (The term "hydrous oxalic acid" as employed herein denotes generically oxalic acid crystals (C$_2$H$_2$O$_4$.2H$_2$O) and mixtures of oxalic acid with water or water-containing substances. The term "an inert reaction medium which is a solvent for hydrous oxalic acid" denotes generically water and other solvents for hydrous oxalic acid which are substantially inert under the conditions of the reaction; such as, ethyl alcohol, dioxane, etc.) Preferably, the process is carried out by reacting an anthraquinone amine, more particularly an alpha-primary-aminoanthraquinone, with an aldehyde and with an aqueous solution of oxalic acid.

We have discovered, in accordance with the present invention, that hydrous oxalic acid in an inert solvent therefore is an advantageous reagent for the production of N-substituted aminoanthraquinones from anthraquinone amines and aldehydes. This result is surprising in view of the disclosure in German Patents 62,703 to Orth and 68,649 to Farbewerke that 3-amino-1,2-dihydroxy-anthraquinone (beta-amino-alizarine) is converted to Alizarine Blue (Color Index No. 1066) when heated with acetaldehyde and anhydrous oxalic acid in ethyl alcohol, and a similar product is obtained with formaldehyde.

Further, in accordance with the present invention, we have found that an aqueous solution of oxalic acid is an especially advantageous reagent for the production of mixtures of mono- and disulfonates of N-substituted alpha, alpha-diamino-alpha, alpha-dihydroxy-anthraquinones, and particularly mixtures of the mono- and disulfonates of 1,5-di(methylamino)-4,8-dihydroxy-anthraquinone, from the corresponding diamino-dihydroxy-anthraquinone disulfonates and an aldehyde, especially formaldehyde. When an aqueous solution of oxalic acid is used in accordance with the present invention, the conditions of the reaction are capable of variation over a considerable range without adversely affecting the quality and yield of the desired N-alkylated diamino-dihydroxy-anthraquinone sulfonates, and a higher yield of said sulfonates is obtained than was obtainable by previously known processes. For example, we have found, in the production of a dyestuff which is a mixture of mono- and disulfonates of alpha, alpha-(di(methylamino)-alpha, alpha-dihydroxy-anthraquinone by reaction of an alpha, alpha-diamino-alpha, alpha-dihydroxy-anthraquinone disulfonic acid with formaldehyde and an aqueous solution of oxalic acid, in accordance with the present invention, the temperature may vary over a considerable range (for example, from 20° to 100° C.) and the amounts of formaldehyde and oxalic acid may vary over a considerable range. This result is surprising in view of the fact that the reaction of an alpha, alpha-diamino-alpha, alpha-dihydroxy-anthraquinone disulfonic acid with formaldehyde and formic acid for the production of such a dyestuff is sensitive to variations in the reaction conditions and in the proportions of the reagents. It is further surprising in view of the tendency of oxalic acid to form amides when heated with aromatic amines.

In carrying out the process in accordance with the present invention, the anthraquinone amine may be reacted in separate stages with the aldehyde and with the hydrous oxalic acid, or the anthraquinone amine may be reacted with the aldehyde and the hydrous oxalic acid in a single stage. Thus, the anthraquinone amine and the aldehyde may be heated to form an intermediate product, preferably in an inert organic liquid as a solvent or diluent (such as, ethyl alcohol, propyl alcohol, isobutyl alcohol, normal butyl alcohol, amyl alcohol, dioxane, etc.), and the intermediate product, after isolation from the reaction mixture or without isolation from the reaction mixture, may be heated with the hydrous oxalic acid in an inert solvent therefor; or the anthraquinone amine, the aldehyde and the hydrous oxalic acid may be heated together in an inert solvent for the oxalic acid. Preferably the reaction with oxalic acid is carried out in a medium containing sufficient water to dissolve the oxalic acid at the reaction temperature.

In carrying out the production of N-alkylated alpha,alpha - diamino - alpha,alpha - dihydroxyanthraquinone sulfonates in accordance with the present invention, an alpha,alpha - diamino-alpha,alpha-dihydroxy-anthraquinone sulfonate, especially a disulfonate in the form of a water-soluble salt, is preferably heated in aqueous solution with 5 to 25 mols of an aldehyde and 4 to 20 mols of oxalic acid. Preferably the amount of water is at least sufficient to dissolve the sulfonate and the oxalic acid at the reaction temperature.

The nature of the reaction which takes place is not fully understood. Presumably it involves condensation of the aldehyde with an amino group of the anthraquinone amine to form an aldimine or alkylolamine, and reduction of the latter to the corresponding N-alkylated aminoanthraquinone. The oxalic acid apparently acts in the role of a reducing agent and, in some cases, as a condensing agent and/or as a desulfonating agent.

The amounts of aldehyde and of oxalic acid employed in the process of the invention are preferably in excess of one mol of each per atomic equivalent of amine hydrogen to be replaced by an alkyl group. For example, in reacting 4,8 - diamino-1,5-dihydroxy-anthraquinone-2,6-disodium disulfonate with formaldehyde and hydrous oxalic acid in accordance with the present invention, the quantity of formaldehyde employed per mol of disulfonate is advantageously in excess of 9 mols and is preferably 13 to 15 mols, and the quantity of oxalic acid ($C_2H_2O_4.2H_2O$) is advantageously at least 4 mols and is preferably about 5 mols.

The temperature employed in carrying out the reaction is usually at least 50° C. Temperatures from 50° to 100° C. are preferred. In general the reaction is permitted to continue until the desired change has taken place in the reaction mixture. When the anthraquinone amine is soluble in the reaction mixture the course of the reaction can generally be followed by observing alterations in color properties of the mixture, e. g., viewing its absorption spectrum. Or the progress of the reaction may be ascertained by means of test samples of the reaction mass.

If the reaction products are insoluble in the reaction mixture, they may be recovered by filtration in the form of a filter cake and may be purified, for instance, by crystallization from an organic solvent, such as chlorbenzene or nitrobenzene. When the products are water-soluble, as in the case of certain of the aminoanthraquinone sulfonic acids, they can be precipitated by acidifying the reaction mixture with a mineral acid (e. g., hydrochloric acid) or by salting out (e. g., with sodium chloride).

The invention will be illustrated by the following examples. It will be understood that the invention is not limited thereto, however. Parts and percentages are by weight and temperatures are in degrees centigrade. Alizarine Sapphire, employed in certain of the examples, was a commercial form of Alizarine Sapphire (Color Index 1054) containing, per hundred parts, about 75 parts of 4,8-diamino-1,5-dihydroxy-anthraquinone-2,6-disodium disulfonate and the remainder mainly inorganic salts.

*Example 1.*—A mixture of 150 parts of Alizarine Sapphire, 2250 parts of water and 150 parts of oxalic acid crystals ($C_2H_2O_4.2H_2O$) was heated to 65° to 70° with agitation in a glass reaction vessel provided with a reflux condenser. 250 parts of aqueous formaldehyde of 37% strength were introduced into the mixture and agitation was continued at 70° for 5 hours. During this period the color of the reaction mixture changed from reddish-blue to greenish-blue. The mixture was then diluted with 1850 parts of 20° Bé. hydrochloric acid, which reduced the temperature to 30° to 40° and caused the dyestuff to crystallize. The resulting precipitate was recovered, in the form of a filter cake, by filtration at 25°. The filter cake was washed with 550 parts of 20% hydrochloric acid and dried at 100° to 125°. The product when ground was a greenish-blue powder, readily soluble in water, and dyeing wool from an acid bath in bright greenish-blue shades which did not appear more reddish when viewed by artificial light. It is believed to be essentially a mixture of 4,8-di(methylamino)-1,5-dihydroxy-anthraquinone-2,6-disulfonic acid and 4,8-di(methylamino)-1,5-dihydroxy-anthraquinone-2-monosulfonic acid having, respectively, the probable formulas:

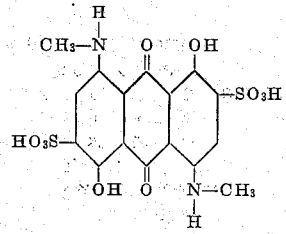

and

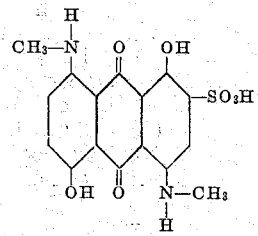

*Example 2.*—A mixture of 150 parts of water, 80 parts of oxalic acid crystals ($C_2H_2O_4.2H_2O$), 33 parts of 37% aqueous formaldehyde, and 40 parts of Alizarine Sapphire was heated with agitation to 50° to 70° in a glass vessel provided with a reflux condenser. The mixture was maintained at that temperature for about 2 to 3 hours, then heated to 90° to 100° and agitated at this temperature for about 16 hours. The mixture was filtered at 80°, and the filter cake was washed with 300 parts of 10% aqueous sodium chloride solution and dried. Except for slightly lower solubility in water, the resulting dyestuff possessed essentially the same properties as that obtained according to Example 1.

*Example 3.*—A mixture of 40 parts of oxalic acid crystals ($C_2H_2O_4.2H_2O$), 150 parts of water, 40 parts of Alizarine Sapphire, and 12 parts of paraldehyde ($C_2H_4O)_3$ was heated to 50° to 70° in a glass vessel provided with a reflux condenser, and agitated at that temperature for about 3 hours. The mixture was then heated to refluxing temperature (104° to 108°), and after heating and refluxing for about 16 hours it was filtered at 75°. The dyestuff was recovered in the form of a filter cake, which was washed with 10% aqueous sodium chloride solution and dried. The product when ground was a greenish-blue powder, soluble in water, and dyeing wool from an acid bath in greenish-blue shades which were redder and duller in daylight, as well as artificial light, than the dyestuff obtained in Example 1. It is believed to be essentially a mixture of 4,8-di(ethylamino)-1,5-dihydroxyanthraquinone-2,6-disodium disulfonate and 4,8-di(ethylamino)-1,5-dihydroxy-anthraquinone-2-sodium monosulfonate, having the probable formulas:

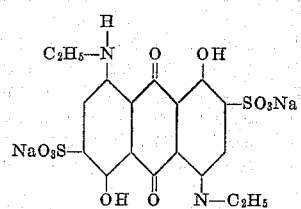

and

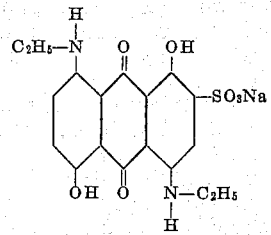

*Example 4.*—A mixture of 20 parts of 1-aminoanthraquinone in the form of an aqueous paste (obtained by acid-pasting 1-aminoanthraquinone by dissolving it in 10 times its weight of 100% sulfuric acid, drowning in water, filtering, and washing the filter cake acid-free with water), 40 parts of oxalic acid crystals, and sufficient water to make a total of 500 parts of water was heated in a flask to 80°. 75 parts of aqueous formaldehyde of 37% strength were added, and the mixture was refluxed overnight (95°–105°) at atmospheric pressure. The mass was then filtered, and the filter cake was washed acid-free with water and dried. The dried product was crystallized twice from monochlorobenzene. 1-methylaminoanthraquinone thus obtained melted at 172° (uncorr.).

*Example 5.*—A mixture of 20 parts of 1-aminoanthraquinone, 20 parts of paraformaldehyde, 40 parts of oxalic acid crystals, and 300 parts of dioxane was heated with agitation to 90° to 100° and stirred at that temperature for 10 hours. As the reaction progressed, the mass became redder in color and the undissolved particles of 1-aminoanthraquinone gradually disappeared. The resulting solution was cooled to room temperature and then drowned in water. The diluted mass was filtered, and the filter cake was washed acid-free with water. The crude 1-methylaminoanthraquinone thus obtained contained some unreacted 1-aminoanthraquinone.

*Example 6.*—A mixture of 20 parts of 1-aminoanthraquinone and 250 parts of alcohol (2B denatured) was heated with agitation to 75°, and 75 parts of aqueous formaldehyde of 37% strength were added. The reaction mass was heated to boiling and refluxed at 78°–84° at atmospheric pressure for 6 hours. The mass was then filtered, and the filter cake was washed with water to remove adhering formaldehyde. The filter cake was agitated with 600 parts of water and 40 parts of crystallized oxalic acid, and the resulting slurry was heated to boiling and refluxed at 100°–105° at atmospheric pressure for 6 hours. The mass was then filtered, and the filter cake was washed with water and dried.

*Example 7.*—20 parts of 1,5-diamino-4,8-dihydroxy-anthraquinone were slurried in 250 parts of alcohol (2B denatured) and the slurry was heated to 75°. 75 parts of aqueous formaldehyde of 37% strength were introduced into the agitated mass, which was then heated to boiling and refluxed at 78°–84° for 6 hours. The reaction mass was allowed to cool to room temperature and was filtered, and the filter cake was washed with about 100 parts of the alcohol and sucked dry. The coppery crystals thus obtained were mixed with 600 parts of water and 40 parts of oxalic acid crystals. The resulting slurry was heated to boiling and refluxed at 98°–105° at atmospheric pressure for 5 hours, during which the color of the reaction mixture became greener. The mass was then filtered, and the filter cake was washed acid-free with water and dried. The resulting N-methyl-1,5-diamino-4,8-dihydroxy-anthraquinone was much greener and was more soluble in alcohol, monochlorobenzene and 100% sulfuric acid than the 1,5-diamino-4,8-dihydroxy-anthraquinone starting material.

The invention is not limited to the foregoing examples. Changes can be made in the process illustrated therein without departing from the scope of the invention.

Thus, the anthraquinone amine employed in any of the above examples may be replaced by any of the anthraquinone amines used in other examples; furthermore, any other anthraquinone amine containing a replaceable hydrogen atom in a nuclear amino group may be employed; for example:

2-amino-anthraquinone
1,4-diamino-anthraquinone
1,4,5-triamino-anthraquinone
1,4,5,8-tetramino-anthraquinone
1-amino-4-hydroxy-anthraquinone
1-amino-4-phenylamino-anthraquinone-2-sulfonic acid
1-amino-4-benzoylamino-anthraquinone
4,5-diamino-1,8-dihydroxy-anthraquinone and sulfonic acids thereof, and other
4,8-diamino-1,5-dihydroxy-anthraquinone sulfonic acids.

While primary aminoanthraquinones are preferred, and especially alpha-primary-amino-anthraquinones, the process of the invention may be applied to secondary aminoanthraquinones. The process of the present invention is applied most advantageously to alpha,alpha-diamino-alpha,alpha-dihydroxy-anthraquinone disulfonates (such as: 4,8-diamino-1,5-dihydroxy-anthraquinone disulfonic acids; 4,5-diamino-1,8-dihydroxy-anthraquinone disulfonic acids; and their alkali metal salts).

Moreover, a salt of an aminoanthraquinone (e. g., an oxalate or other derivative capable of regenerating the aminoanthraquinone or capable of forming its oxalate in the reaction mixture) may be employed. Accordingly the terms "anthraquinone amine" and "aminoanthraquinone," as employed herein and in the claims, include salts and derivatives.

Instead of the aldehydes employed in the above examples or the foregoing modifications thereof, other aldehydes may be employed. The aldehydes which may be employed in the process comprise aldehydes of the aliphatic, cycloaliphatic, aromatic, hydroaromatic and heterocyclic series; e. g., formaldehyde, acetaldehyde, lauraldehyde, benzaldehyde, cinnamaldehyde, furfural, etc. Aliphatic aldehydes are preferred. Further, the aldehydes may be employed in the form of their polymers or their derivatives which liberate the aldehyde under the reaction conditions; e. g., paraldehyde, paraformaldehyde, trioxymethylene. Accordingly, such compounds are included in the term "aldehyde" in the claims, molar proportions thereof being expressed, however, in terms of the parent monomeric, simple aldehyde.

As indicating the manner in which the conditions of the process of the invention may be varied, Example 1 will be taken for purposes of illustration. In this example the following proportions of reactants were employed:

| | Mols |
|---|---|
| Disodium - 4,8 - diamino - 1,5 - dihydroxy-anthraquinone - 2,6 - disulfonate | 1 |
| Oxalic acid | 5.1 |
| Formaldehyde | 13.3 |
| Water | 587 |

While 13 to 15 mols of formaldehyde per mol of disulfonate are preferably used, greater amounts can be used; smaller amounts down to about 10 mols can be used without substantial alteration of other conditions, and lesser amounts (e. g., 5 mols) can be used if the reaction temperature is raised and/or the reaction period is lengthened (for instance, as in Example 2). The amounts of oxalic acid and water also can be varied, within the limits pointed out above, without essentially modifying the course of the reaction. Preferably about 5 to about 10 mols of oxalic acid are employed, although lesser amounts also can be used. A reduction of the amount of water to less than about 150 mols is not desirable since it tends to reduce the solubility of the resulting dyestuff in water.

The greenish-blue dyestuff produced from Alizarine Sapphire and formaldehyde by the process of the present invention is preferably recovered by drowning the reaction mixture in aqueous hydrochloric acid, in accordance with the procedure of Example 1. The N-alkylated product thus obtained is more soluble in water than the dyestuff prepared without such mineral acid treatment.

We claim:

1. A process for the production of an N-substituted aminoanthraquinone dyestuff which comprises reacting an aminohydroxy anthraquinone sulfonic acid containing a replaceable hydrogen atom in a nuclear amino group with an aldehyde and with hydrous oxalic acid containing at least two mols of water per mol of oxalic acid, in an inert reaction medium which is a solvent for hydrous oxalic acid.

2. A process for the production of an N-alkylated aminoanthraquinone dyestuff which comprises reacting an aminohydroxyanthraquinone sulfonic acid containing a replaceable hydrogen atom in a nuclear amino group with an aliphatic aldehyde and with hydrous oxalic acid containing at least two mols of water per mol of oxalic acid, in an inert reaction medium which is a solvent for hydrous oxalic acid.

3. A process for the production of an N-alkylated aminohydroxyanthraquinone dyestuff which comprises reacting a primary-aminohydroxyanthraquinone sulfonic acid with formaldehyde and with hydrous oxalic acid containing at least two mols of water per mol of oxalic acid, in an inert reaction medium which is a solvent for hydrous oxalic acid.

4. A process for the production of an N-substituted aminohydroxyanthraquinone which comprises reacting an aminohydroxyanthraquinone sulfonic acid containing, at least, a primary-amino group and a hydroxy group in alpha positions of the anthraquinone nucleus, with an aldehyde and with hydrous oxalic acid containing at least two mols of water per mol of oxalic acid, in an inert reaction medium which is a solvent for hydrous oxalic acid.

5. A process for the production of an N-substituted alpha,alpha-diamino-alpha,alpha-dihydroxy-anthraquinone sulfonic acid which comprises reacting an alpha,alpha-diamino-alpha,alpha-dihydroxy-anthraquinone sulfonic acid with an aldehyde and with an aqueous solution of oxalic acid.

6. A process for the production of an N-alkylated alpha,alpha-diamino-alpha,alpha-dihydroxy-anthraquinone sulfonic acid which comprises reacting an alpha,alpha-diamino-alpha,alpha-dihydroxy-anthraquinone disulfonic acid with an aliphatic aldehyde and with an aqueous solution of oxalic acid.

7. A process for the production of an N-alkylated alpha,alpha-diamino-alpha,alpha-dihydroxy-anthraquinone sulfonic acid which comprises reacting an alpha, alpha-diamino-alpha, alpha-dihydroxy-anthraquinone disulfonic acid with formaldehyde and with an aqueous solution of oxalic acid.

8. A process for the production of an N-substituted aminoanthraquinone dyestuff which comprises reacting an aminohydroxyanthraquinone sulfonic acid containing a replaceable hydrogen atom in a nuclear amino group with an aldehyde and with hydrous oxalic acid containing at least two mols of water per mol of oxalic acid, in an inert reaction medium which is a solvent for hydrous oxalic acid, the quantities of said aldehyde and of oxalic acid each being in excess of one mol per atomic equivalent of amine hydrogen to be replaced.

9. A process for the production of a blue dyestuff for animal fibers which comprises heating an aqueous solution of an alpha, alpha-diamino-alpha, alpha-dihydroxy-anthraquinone disulfonic acid with an aliphatic aldehyde and oxalic acid, the quantities of oxalic acid and of said aldehyde being each in excess of two mols per mol of said diamino-dihydroxy-anthraquinone disulfonic acid, and the quantity of water being greater than two mols per mol of oxalic acid.

10. A process for the preparation of a blue dyestuff for animal fibers which comprises heating 4,8-diamino-1,5-dihydroxy - anthraquinone - 2,6-disulfonic acid with an aliphatic aldehyde and an aqueous solution of oxalic acid at a temperature of at least 50° C.

11. A process for the preparation of a blue dyestuff for animal fibers which comprises heating one mol of 4,8-diamino-1,5-dihydroxy-anthraquinone-2,6-disulfonic acid with at least 4 mols of formaldehyde and at least 4 mols of oxalic acid in the form of an aqueous solution at a temperature of 50° to 100° C., acidifying the resulting reaction mixture to precipitate the dyestuff, and separating the precipitate from the mother-liquor.

12. A process for the preparation of a blue dyestuff for animal fibers which comprises heating an aqueous solution of one mol of 4,8-diamino-1,5-dihydroxy-anthraquinone-2,6-disulfonic acid with 5 to 15 mols of formaldehyde and 5 to 10 mols of oxalic acid at a temperature of 50° to 100° C., precipitating the resulting dyestuff by acidifying the reaction mixture with hydrochloric acid, and separating the precipitate from the mother-liquor.

ARMAS VICTOR ERKKILA.
ROBERT C. HOARE.

REFERENCES CITED

The following references are of record in the file of this patent:

UNITED STATES PATENTS

| Number | Name | Date |
|---|---|---|
| 1,889,831 | Gutzwiller | Dec. 6, 1932 |
| 1,957,858 | Stein | May 8, 1934 |

FOREIGN PATENTS

| Number | Country | Date |
|---|---|---|
| 250,968 | Great Britain | July 18, 1927 |
| 295,257 | Great Britain | June 13, 1929 |
| 62,703 | Germany | May 9, 1892 |
| 68,649 | Germany | Apr. 18, 1893 |
| 123,745 | Germany | Aug. 22, 1901 |
| 156,056 | Germany | Nov. 9, 1904 |
| 443,585 | Germany | May 4, 1927 |
| 137,119 | Switzerland | Dec. 15, 1929 |

OTHER REFERENCES

Hollemann: "Textbook of Organic Chemistry," 3rd ed., 1907, page 199.

Houben: "Das Anthracen und die Anthrachinone" (1929), page 417.